United States Patent
Pratley et al.

(10) Patent No.: US 7,681,559 B2
(45) Date of Patent: Mar. 23, 2010

(54) TORSION DAMPING MECHANISM FOR A SUPERCHARGER

(75) Inventors: Mark H. Pratley, Marshall, MI (US); Michael J. Otto, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 196 days.

(21) Appl. No.: 11/643,319

(22) Filed: Dec. 21, 2006

(65) Prior Publication Data

US 2008/0149452 A1    Jun. 26, 2008

(51) Int. Cl.
*F02B 33/00* (2006.01)
*F02B 33/38* (2006.01)
*F02B 39/12* (2006.01)
*F02B 39/14* (2006.01)
*F16H 15/12* (2006.01)
*F16H 15/14* (2006.01)
*F16C 3/00* (2006.01)
*F16C 1/00* (2006.01)
*F16D 3/00* (2006.01)

(52) U.S. Cl. ............... 123/559.1; 192/30 V; 74/574.4; 464/180; 464/57; 464/77

(58) Field of Classification Search ............ 123/559.1; 192/30 V; 464/57, 66, 67, 77, 100, 180, 464/160; 74/574.4
See application file for complete search history.

(56) References Cited

U.S. PATENT DOCUMENTS

| | | | | |
|---|---|---|---|---|
| 3,002,594 A | * | 10/1961 | Haseler et al. | 464/57 |
| 3,019,871 A | * | 2/1962 | Sauzedde | 192/30 V |
| 3,236,066 A | * | 2/1966 | Webb | 464/77 |
| 3,241,396 A | * | 3/1966 | Magrum | 464/81 |
| 3,986,411 A | * | 10/1976 | Kirby | 74/573.1 |
| 4,844,044 A | | 7/1989 | McGovern | 123/559.1 |
| 4,924,839 A | | 5/1990 | Mueller et al. | 123/559.1 |
| 4,944,278 A | | 7/1990 | Woodard | 123/559.1 |
| 4,944,279 A | | 7/1990 | Woodard | 123/559.1 |
| 4,953,517 A | | 9/1990 | McGovern et al. | 123/559.1 |
| 5,893,355 A | | 4/1999 | Glover et al. | 123/559.1 |
| 6,128,972 A | * | 10/2000 | Cooke et al. | 192/30 V |
| 6,253,747 B1 | | 7/2001 | Sell et al. | 123/559.1 |
| 6,725,985 B2 | * | 4/2004 | Haneishi et al. | 464/180 |
| 6,880,536 B2 | | 4/2005 | Pratley et al. | 123/559.1 |
| 7,004,291 B2 | * | 2/2006 | Schankin et al. | 464/180 |
| 7,044,276 B2 | * | 5/2006 | Haneishi et al. | 464/180 |
| 2007/0175426 A1 | * | 8/2007 | Knecht et al. | 123/90.17 |
| 2008/0034918 A1 | * | 2/2008 | Manzoor et al. | 74/574.4 |
| 2008/0194340 A1 | * | 8/2008 | Kurosu | 464/45 |

FOREIGN PATENT DOCUMENTS

EP     907039 A1 *  4/1999
JP   01058864 A  *  3/1989

* cited by examiner

*Primary Examiner*—Thai Ba Trieu
(74) *Attorney, Agent, or Firm*—Anna M. Shih

(57) ABSTRACT

A torsion damping mechanism for a rotary blower is provided that has improved durability and ease of installation into the rotary blower. A rotary blower including a torsion damping mechanism according to an embodiment of the present invention is also provided.

7 Claims, 8 Drawing Sheets

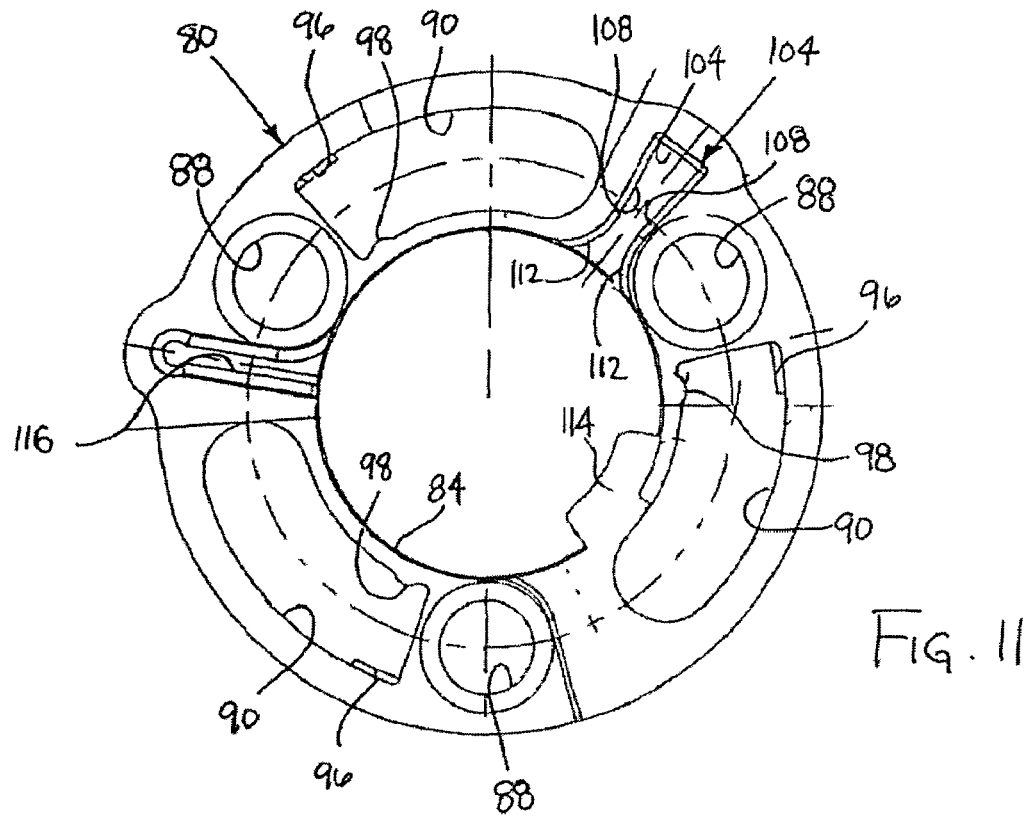
Fig. 11
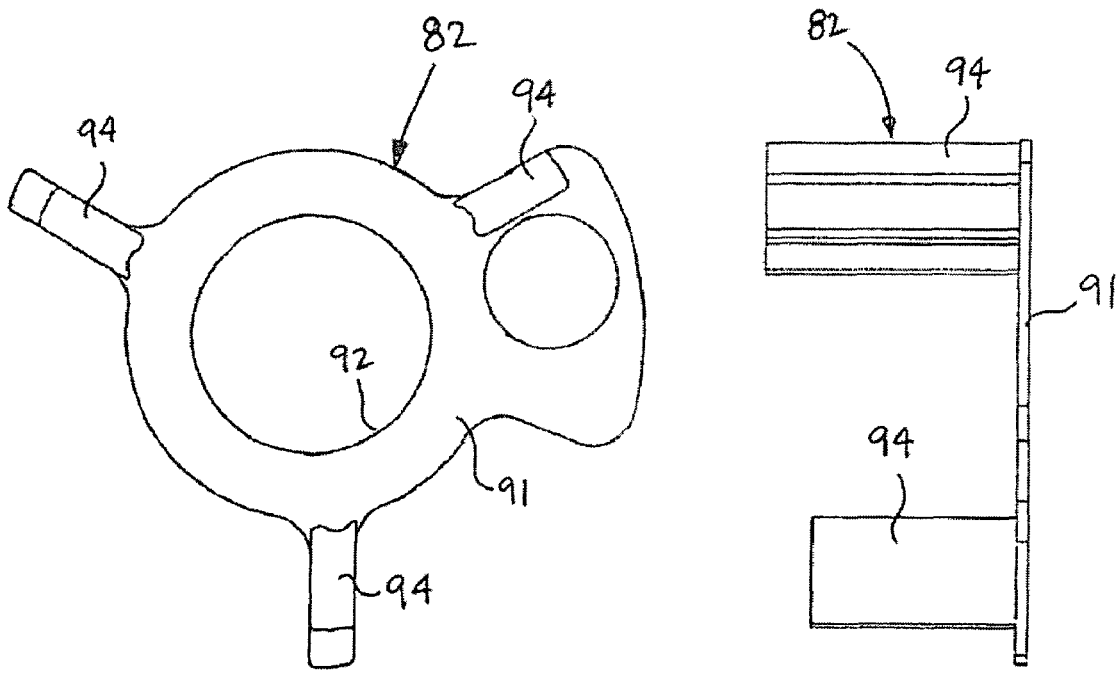
Fig. 12
Fig. 13

TORSION DAMPING MECHANISM FOR A SUPERCHARGER

BACKGROUND OF THE DISCLOSURE

The present invention relates to a rotary blower, and more particularly, to a torsion damping mechanism ("isolator") for reducing audible noise from the blower, and especially from the timing gears.

Although the present invention may be used advantageously on many different types of blowers, regardless of the manner of input drive to the blower, the present invention is especially adapted for use with a Roots-type rotary blower that is driven by an internal combustion engine. In a typical internal combustion engine used commercially for on-highway vehicles, the torque output of the engine is not perfectly smooth and constant, but instead, is generated in response to a series of individual, discrete combustion cycles.

A typical Roots-type blower transfers volumes of air from the inlet port to the outlet port, whereas a screw compressor actually achieves internal compression of the air before delivering it to the outlet port. However, for purposes of the present invention, the blower, or compressor, generally includes a pair of rotors, which must be timed in relationship to each other, and therefore, are driven by meshed timing gears. As is now well known to those skilled in the blower art, the timing gears are potentially subject to conditions such as gear rattle and bounce.

Rotary blowers of the type to which the present invention relates (either Roots-type or screw compressor type) are also referred to as "superchargers", because they are used to effectively supercharge the intake side of the engine. Typically, the input to an engine supercharger is a pulley and belt drive arrangement that is configured and sized such that, at any given engine speed, the amount of air being transferred into the intake manifold is greater than the instantaneous displacement of the engine, thus increasing the air pressure within the intake manifold, and increasing the power density of the engine.

Rotary blowers of either the Roots-type or the screw compressor type are characterized by the potential to generate noise. For example, Roots-type blower noise may be classified as either of two types. The first is solid borne noise caused by rotation of timing gears and rotor shaft bearings subjected to fluctuating loads (the periodic firing pulses of the engine). The noise, which may be produced by the meshed teeth of the timing gears during unloaded (non-supercharging), low-speed operation is also referred to as "gear rattle". The second type of noise is fluid borne noise caused by fluid flow characteristics, such as rapid changes in the velocity of the fluid (i.e., the air being transferred by the supercharger). The present invention is concerned primarily with the solid borne noise caused by the meshing of the timing gears.

To minimize solid borne noise, torsion damping mechanisms ("isolators") have been developed, which can minimize the "bounce" of the timing gears during times of relatively low speed operation, when the blower rotors are not "under load". Such torsion damping mechanisms are also referred to as "isolators" because part of their function is to isolate the timing gears from the speed and torque fluctuations of the input to the supercharger.

One known torsion damping mechanism is shown in FIGS. 1 and 2 of the present application and includes an annular body adapted to be attached to a first input shaft driven by the engine through the pulley and belt drive arrangement. A second input shaft is drivingly connected to the first input shaft by the torsion damping mechanism through a plurality of pins that are received in arcuate slots in the body. Disposed between at least one of the pins and the body of the damping mechanism is a spring providing a resilient drive between the first and second input shafts, which attenuates or isolates torque fluctuations or torque spikes for preventing audible gear tooth rattle of the timing gears during non-supercharging, low engine speed modes of operation.

During the course of the development of a supercharger, one of the primary developmental concerns has been the durability of the torsion damping mechanism, and therefore, the ultimate service or durability life of the supercharger, in terms of the number of hours of operation, prior to any sort of supercharger component failure. Manufacturability and ease of installation are also desirable characteristics of the torsion damping mechanism to ensure, among other things, proper assembly of the supercharger.

BRIEF SUMMARY OF THE INVENTION

A torsion damping mechanism for a rotary blower is provided that is adapted to be rotatably interposed between a first drive member for driving a first gear in constant mesh with a second gear, and a second drive member rotatably driven in one direction by torque from a periodic combustion engine. The torsion damping mechanism includes a generally annular body disposed for rotation about an axis a-a and is fixed to one of the drive members. The body includes a plurality of circumferentially spaced apart bores and a plurality of circumferentially spaced apart generally arcuate-shaped slots. A cushion damper includes a plurality of cushioning members, each adapted to be received in a corresponding slot in the body. In an embodiment of the present invention, at least one of the slots includes an interference member positioned to create an interference fit between the body and the cushioning members to secure the cushioning members in the slots and inhibit movement of the cushion damper relative to the body. Axially extending first pins each have one end loosely received by one of the slots and another end fixed to the first drive member. Axially extending second pins each having one end fixedly received by the bores and another other end fixed to the second drive member. A spring is fixed at one end to the body and has a free end extending radially in cantilever fashion into at least one of the slots. The spring is interposed between the cushioning member of the one slot and the pin therein. In an embodiment of the invention, the body is provided with at least one stress-reducing feature to reduce stress in the spring.

A rotary blower including a torsion damping mechanism according to an embodiment of the present invention is also provided.

BRIEF DESCRIPTION OF THE DRAWINGS

FIG. 11 is a front plan view of the torsion damping mechanism body shown in FIG. 10.

FIG. 12 is a rear plan view of a torsion damping mechanism cushion damper according to an embodiment of the present invention.

FIG. 13 is a side view of the cushion damper shown in FIG. 12.

DETAILED DESCRIPTION OF THE PREFERRED EMBODIMENT

Figure 3:
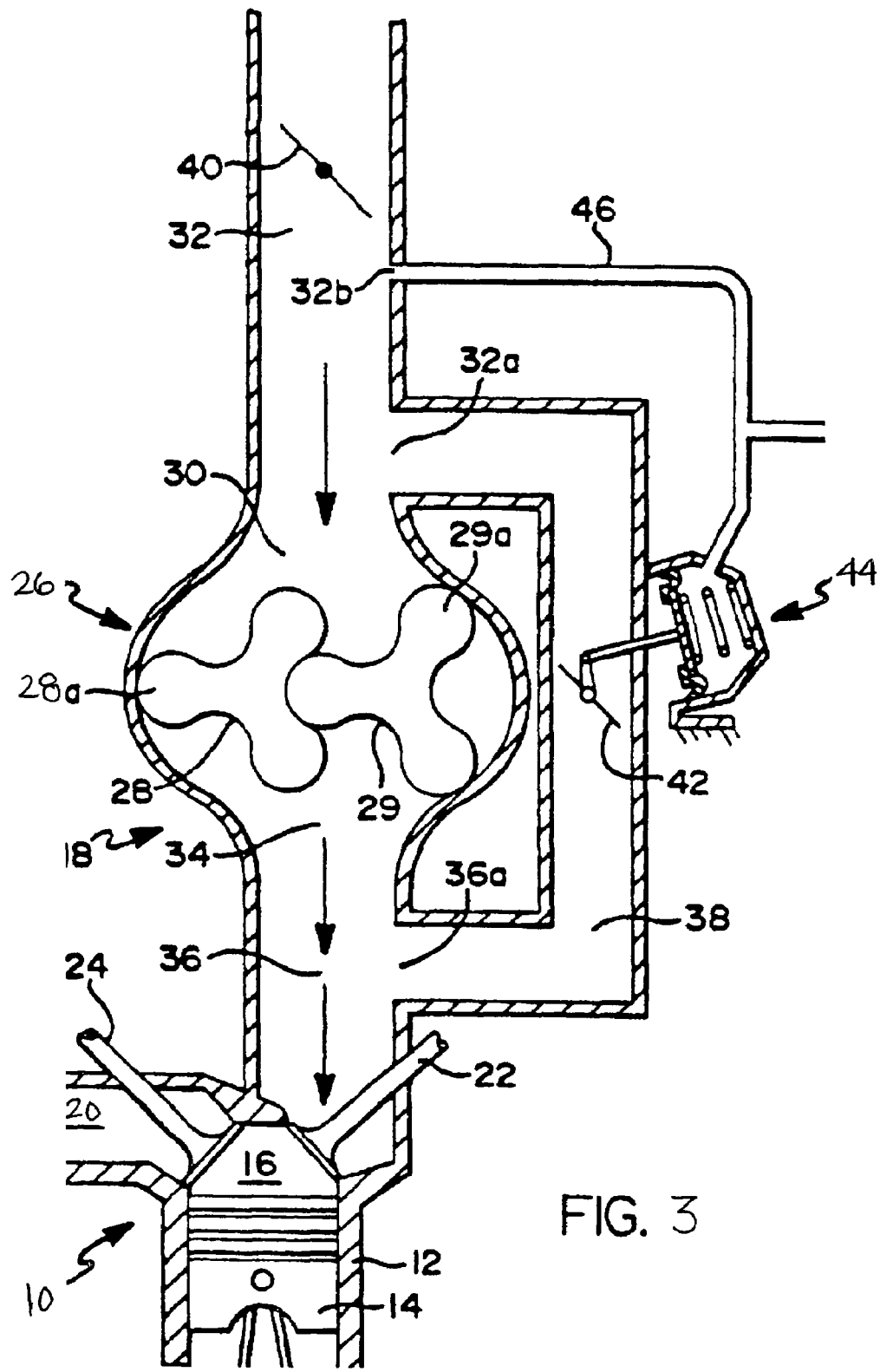
FIG. 3 is a schematic illustration of an intake manifold assembly having a positive displacement blower or supercharger for boosting intake pressure to an internal combustion engine.

Schematically illustrated in FIG. 3 is a portion of an internal combustion engine 10, which may be of a periodic combustion type, such as the Otto or Diesel cycle type. The engine includes a plurality of cylinders 12 and a reciprocating piston 14 disposed within each cylinder to define an expandable combustion chamber 16. The engine also includes intake and exhaust manifold assemblies 18, 20 for respectively directing combustion air to-and-from the combustion chambers via intake and exhaust valves 22, 24.

The intake manifold assembly 18 includes a positive displacement blower or supercharger 26 of the backflow or Roots-type having a pair of rotors 28, 29 with meshed lobes 28a, 29a. The rotors 28, 29 may be mechanically driven by engine crankshaft torque transmitted thereto in known manner via an unshown drive belt. The mechanical drive rotates the blower rotors 28, 29 at a fixed ratio relative to crankshaft speed, such that the blower displacement is greater than the engine displacement, thereby boosting or supercharging the air going to the engine combustion chambers to increase engine power.

The illustrated blower includes an inlet port 30 that receives an air or air-fuel mixture charge from an inlet duct or passage 32 and a discharge or outlet port 34 directing the charge to the intake valves 22 via a discharge duct or passage 36. The intake and discharge ducts are intercommunicated via a bypass duct or passage 38 connected at openings 32a, 36a in the intake and discharge ducts 32, 36, respectively. If the engine 10 is of the Otto cycle type, a throttle valve 40 preferably controls air or air-fuel mixture flow into intake duct 32 from a source, such as ambient or atmospheric air, in a well known manner.

Disposed within the bypass duct 38 is a bypass valve 42, which is moved between open and closed positions by an actuator assembly 44 responsive to pressure in inlet duct 32 via a line 46 and, therefore, operative to control supercharging pressure in duct 36 as a function of engine power demand. When bypass valve 42 is in the fully open position, the air pressure in discharge duct 36 is relatively low relative to the air pressure in intake duct 32. When the valve 42 is fully closed, the air pressure in the discharge duct is relatively high.

Figure 4:
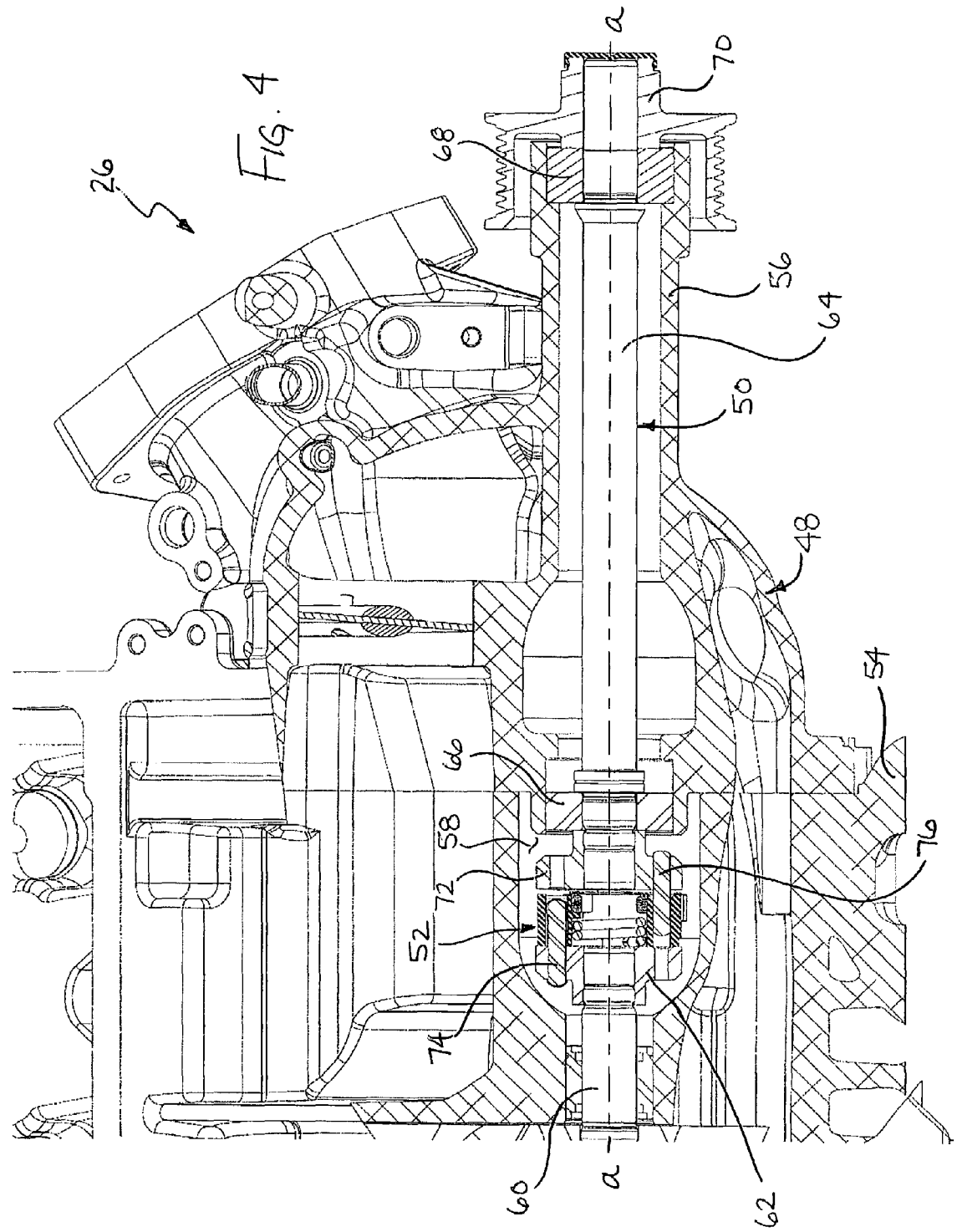
FIG. 4 is an enlarged, fragmentary, axial cross-section of the input section of the supercharger shown schematically in FIG. 3.
Figure 5:
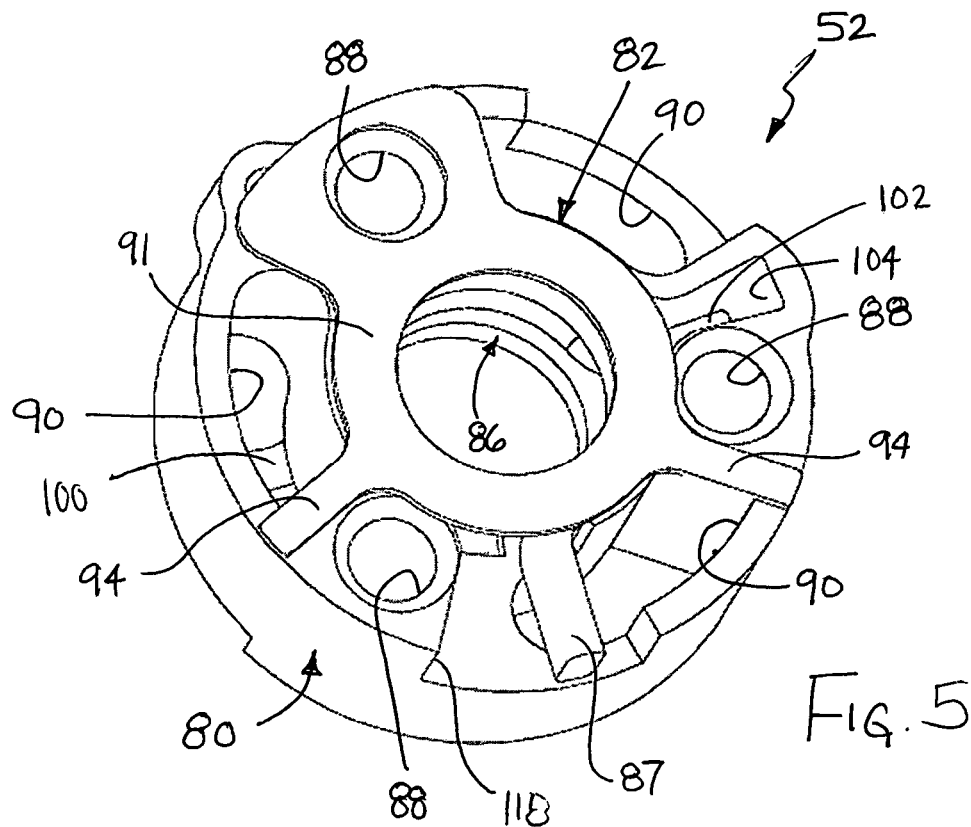
FIGS. 5 and 6 are front and rear perspective views, respectively, of a torsion damping mechanism according to an embodiment of the present invention.
Figure 6:
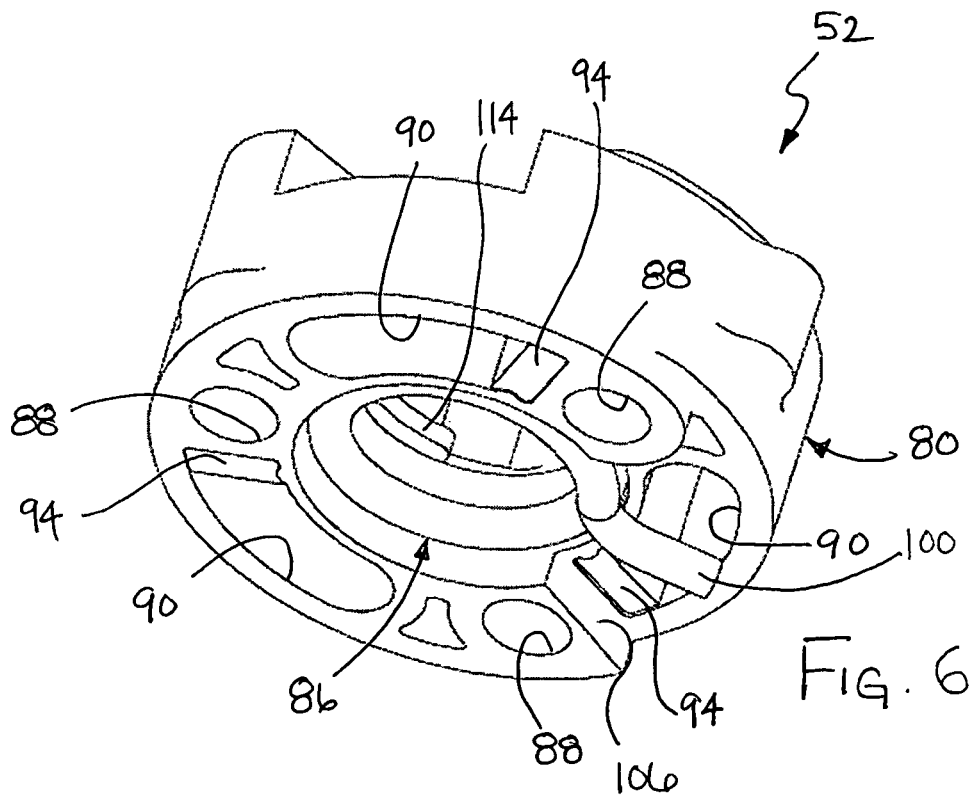
Figure 7:
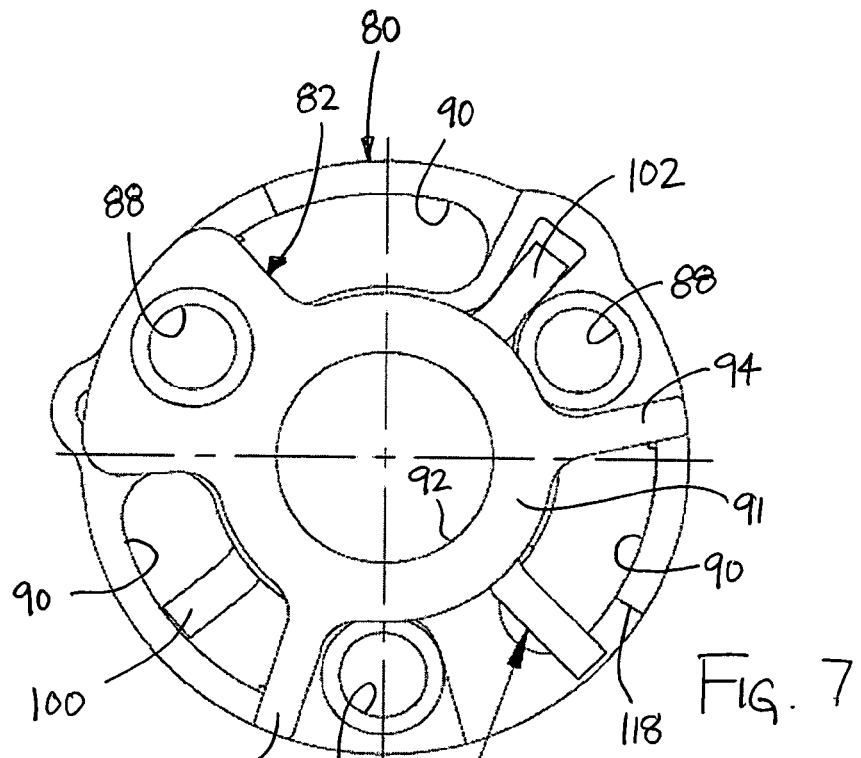
FIGS. 7 and 8 are front and rear plan views, respectively, of the torsion damping mechanism shown in FIGS. 5 and 6.
Figure 8:
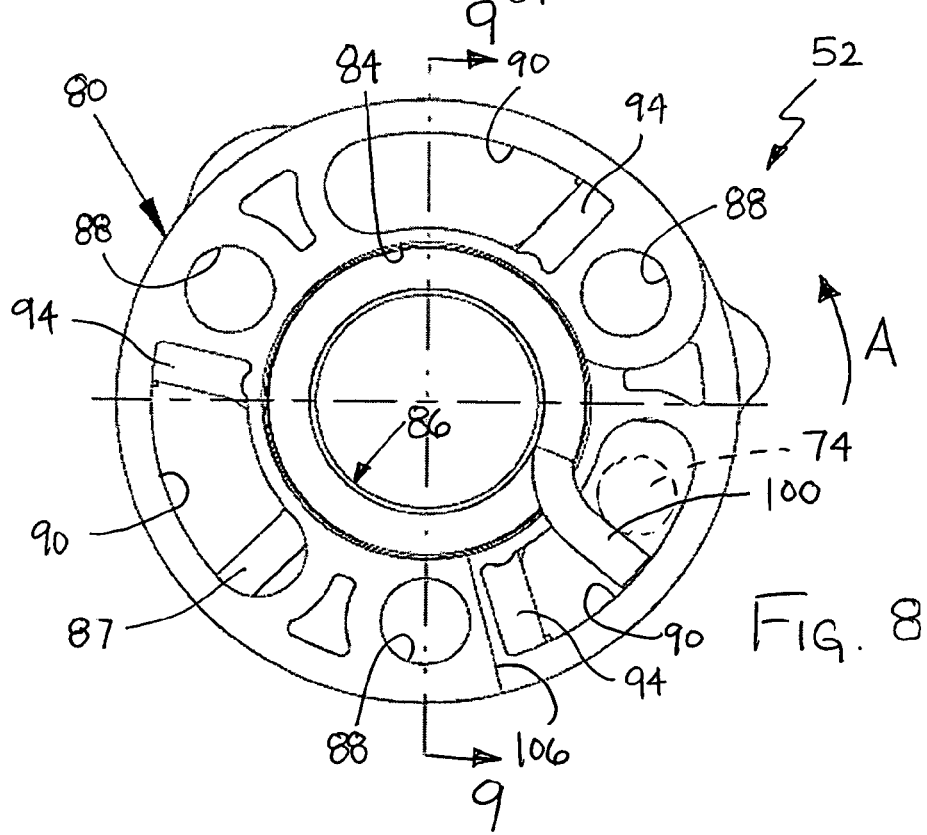
Figure 9:
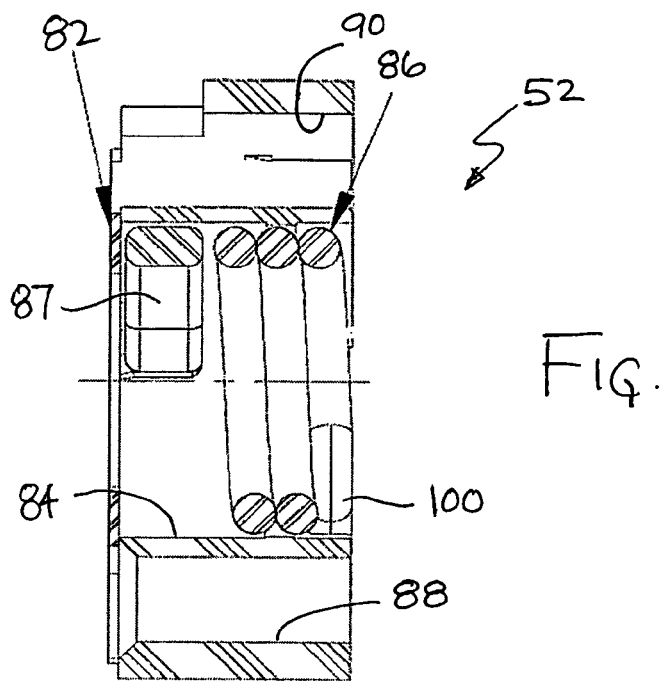
FIG. 9 is a cross-sectional view of the torsion damping mechanism shown in FIG. 7 taken along lines 9-9.
Figure 10:
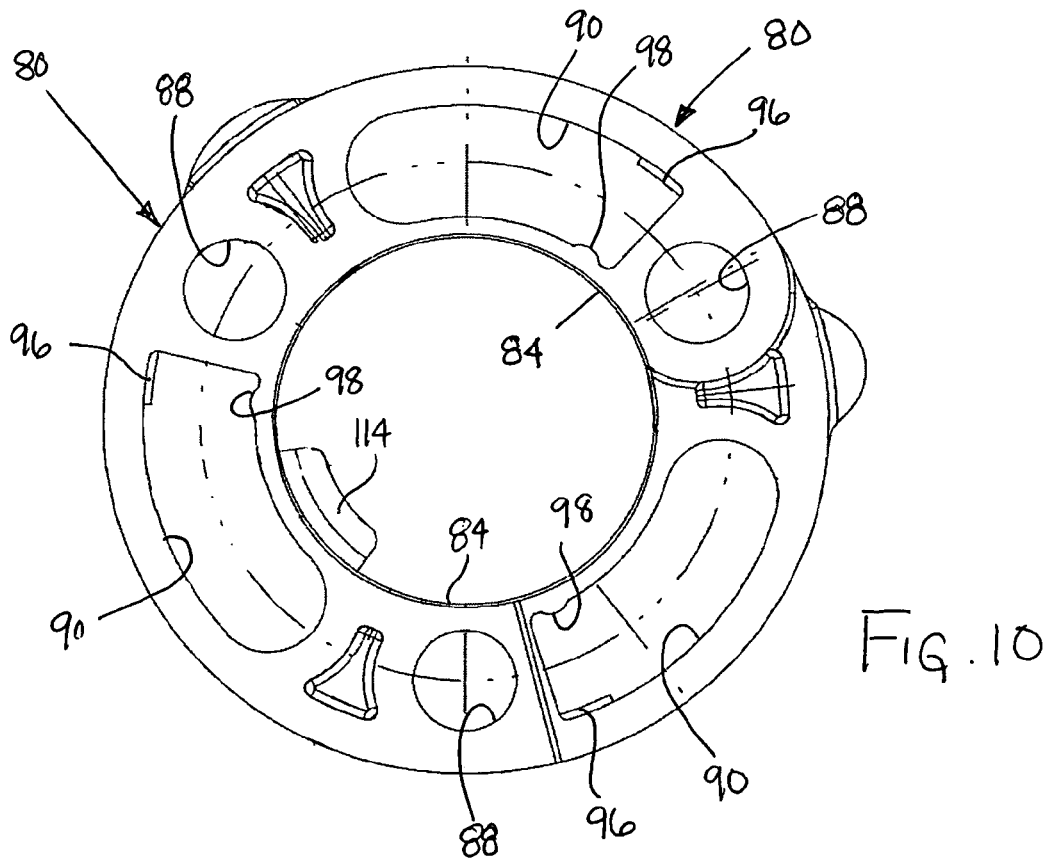
FIG. 10 is a rear plan view of a torsion damping mechanism body according to an embodiment of the present invention.

Looking now at FIG. 4, therein is shown a portion of blower 26 in detail. In the illustrated configuration, blower 26 includes a housing assembly 48, an input drive assembly 50, and a torsion damping mechanism 52 according to an embodiment of the present invention. The housing assembly 48 includes a main housing section 54 that houses the rotors 28, 29, and an input drive section 56 that define therebetween a chamber 58.

The main housing section 56 includes a first drive member or shaft 60 having a right end secured to a first generally annular end member 62 and a left end secured to a timing gear of the blower (neither shown), as is known in the art. The input drive assembly 50 includes a second drive member or shaft 64 supported by anti-friction bearings 66 and 68, a pulley 70 secured to a right end of the second shaft 64, and a second generally annular end member 72 secured to a left end of the second shaft 64. Pulley 70 may be driven by the previously mentioned and unshown belt, which transmits engine torque to the blower 26.

During non-supercharging, low engine speed or idle speed operation, the meshed teeth of the timing gears are substantially unloaded and have been known to bounce or clash back and forth against each other through the backlash therebetween. The bounce or clash produces an objectionable noise known as gear rattle and is believed to be caused by torsionals in the supercharger drive torque provided by periodic combustion engines such as engine 10. The resilient drive provided by torsion damping assembly 52 reduces the rattle noise below the audible range.

In the blower configuration illustrated in FIG. 4, torsion damping mechanism 52 is disposed for rotation about the common axis a-a of the shafts 60, 64. Two sets of three axially extending pins 74, 76 connect a portion of torsion damping mechanism 52 to rotate with first and second end members 62, 72, respectively.

In an embodiment of the present invention shown in FIGS. 5-16, torsion damping mechanism 52 includes a generally annular body 80 formed of a relatively hard plastic or metal material, and a cushion damper 82 secured to body 80 and formed of a relatively soft or compliant elastomeric material. Body 80 includes a central opening 84 concentric to the common axis a-a and sized to receive a first spring 86 and a second spring 87, three circumferentially spaced apart through bores 88, and three circumferentially spaced apart through slots 90 of generally arcuate shape interposed between the through bores 88. Through bores 88 and slots 90 are radially spaced from and extend parallel to the common axis a-a.

As shown in FIG. 4, pins 76 are press fit at one end into second end member 72, and are press fit at the other end into through bores 88 of the body 80. Pins 74 are press fit at one end into first end member 62 and are slidably received at the other end by arcuate slots 90. Pins 74 and slots 90 may be provided with an amount of radial free play therebetween to mitigate the effects of misalignment of shafts 60, 64 and/or components therebetween.

As shown in FIGS. 5, 7, 12 and 13, cushion damper 82 includes a webbing 91 having a central opening 92 concentric to the common axis a-a, and a plurality of cushioning members 94 interconnected by the webbing 91 and defining an end of each slot 90 when cushion damper 82 and body 80 are assembled. All of the slots 90 that receive cushioning members 94 includes an interference member 96, such as a radially inwardly extending barb (see, e.g., FIGS. 11 and 15), which facilitates an interference fit with cushioning members 94 to secure the cushioning members 94 in slots 90 during operation of blower 26. A raised, generally arcuate surface 98 may extend radially outwardly into slots 90 to align with a correspondingly shaped surface on a radially inner portion of cushioning members 94 to properly position the cushioning members during assembly.

Figure 1:
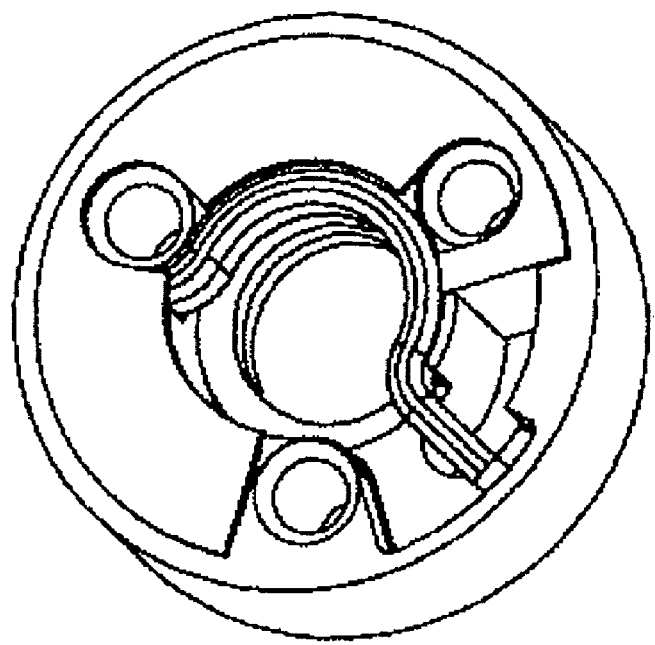
FIGS. 1 and 2 are front and rear perspective views of a prior art torsion damping mechanism.
Figure 2:
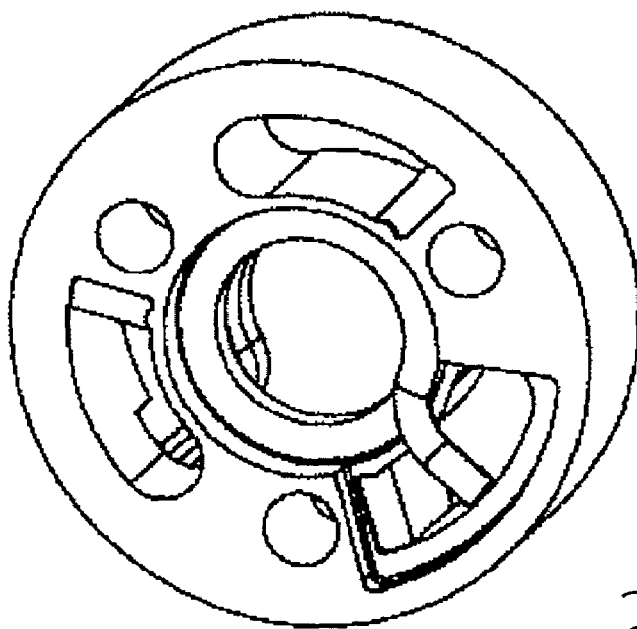

Unlike the prior art torsion damping mechanism shown in FIGS. 1 and 2, the webbing 91 of cushion damper 82 according to the present invention extends over and generally covers a portion of central opening 84 of body 80, leaving each of arcuate slots 90 unobstructed. This configuration allows each of pins 74 to be of substantially equal length—unlike the prior art design in which the pins 74 received in the arcuate slots covered by the prior art cushion damper are shorter than the pin 74 that engages the resilient drive spring. The cushion damper configuration according to the present invention permits each of pins 74 to be substantially the same length, which advantageously permits torsion damping mechanism 52 to be installed against end member 62 in any of three angular orientations. The prior art design can be installed in only one angular orientation.

Cushioning members 94 collectively define a relatively high rate resilient shock absorber for preventing audible impacts of pins 74 against body 80 due to high energy negative torque fluctuations or spikes that occur during engine shut-down, abrupt movement of the engine throttle, and/or rough engine operation at low engine speeds. Since the elastomeric material of cushioning members 94 is selected to withstand high frequency, high energy impacts of pins 74 against cushioning members 94, an elastomer having low hysteresis may be employed, so that the material can respond to the impacts and absorb a series of high energy impacts occurring over a short period of time with minimum distortion and minimum audible noise. Acceptable performance has been obtained with materials, having a modulus of elasticity in the range of 10,000 to 40,000 psi over the normal operating range of the damping mechanism and a hardness in the range of 50 to 80 shore D durometer, preferably a range of 55 to 75. An exemplary material is Hytrel™ polyester elastomers from E.I. Du Pont de Nemours and Company.

First spring 86 provides a resilient drive between first and second end members 62 and 72, which attenuates or isolates torque fluctuations or torque spikes for preventing audible gear tooth rattle of the timing gears during non-supercharging, low engine speed modes of operation. In an embodiment, first spring 86 is a torsion spring having radially extending, opposite ends or tangs 100, 102 interconnected by a plurality of helically wound coils (e.g., about 3.5 coils) disposed in central opening 84 of the body 80. End 102 is retained in a bore 104 against movement relative to body 80 and cushion damper 82. End 100 is disposed for circumferential movement in an axially open, arcuate recess 106 in an end face of body 80, and is positioned against one of pins 74 to resiliently transmit torque in the direction of arrow A in FIG. 8 from pin 74 to end member 62 via body 80 and pins 76. Herein, torque in the direction of arrow A is taken as positive and in the opposite direction as negative.

Figure 14:
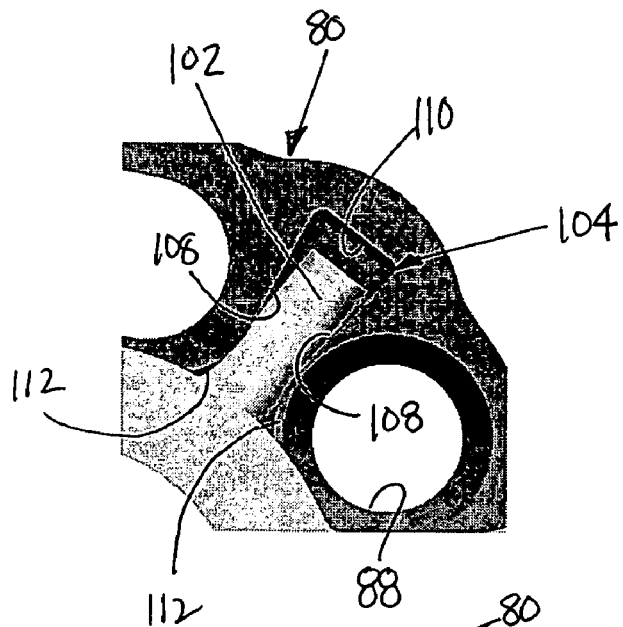
FIG. 14 is a detailed view of a torsion damping mechanism spring shown received in a bore according to an embodiment of the present invention.
Figure 15:
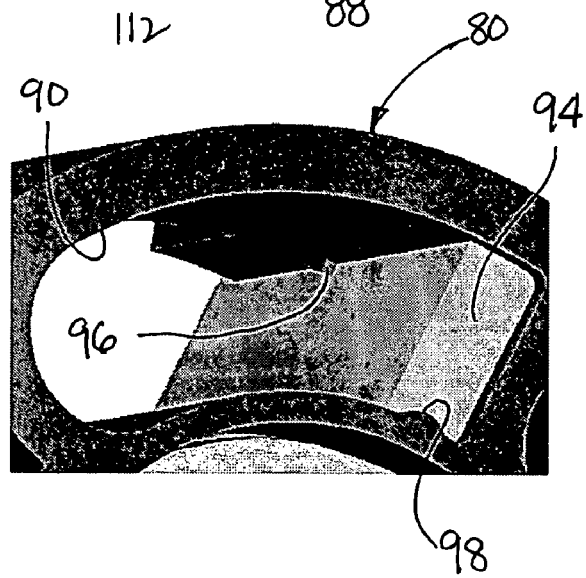
FIG. 15 is a detailed view of a torsion damping mechanism body member slot having received therein a cushioning member according to an embodiment of the present invention.

In an embodiment, torsion damping mechanism 52 is provided with at least one spring stress-reducing feature to reduce stress in first spring 86, which may degrade performance of mechanism 52. One such feature is shown in FIG. 14, wherein the bore 104 includes a pair of side walls 108 that taper inwardly from a radially outward end wall 110 to radii 112, which connect tapered side walls 108 to central opening 84. Unlike the prior art torsion damping mechanism of FIGS. 1 and 2 that includes a spring bore (not shown) having side walls that are perpendicular to the end wall with no radii between the side walls and the central opening, the embodiment of bore 104 shown in FIG. 14 reduces stress in end 102 of spring 86 caused by manufacturing variance in the end 102, and restriction of end 102 caused by loading of spring 86 during operation of blower 26.

Figure 16:
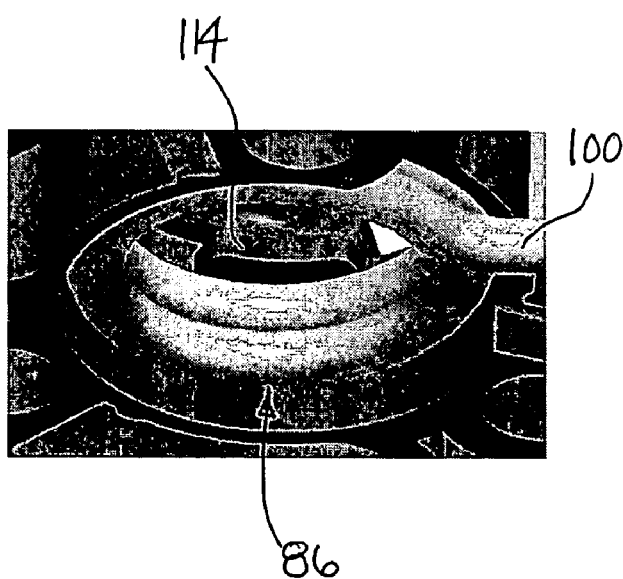
FIG. 16 is a detailed view of a torsion damping mechanism body anti-twist tab according to an embodiment of the present invention.

Another stress-reducing feature for first spring 86 is shown, for example, in FIGS. 4 and 16, and includes a tab 114 that extends radially inwardly into central opening 84 adjacent first spring 86. In the prior art torsion damping mechanism shown in FIGS. 1 and 2, the torsion spring partially wraps around a shaft to inhibit spring twist as the spring is loaded. While contact with the shaft prevents an undesirable twisting of the torsion spring 86 during operation, this contact, unfortunately, may cause fretting of the shaft and spring, particularly if the components are not well lubricated. Contact with the shaft also increases localized stresses in the spring since the spring's movement is restricted. In contrast to the prior art, tab 114 engages first spring 86 to inhibit twisting during operation, without having the spring contact the shafts 62, 64. This configuration eliminates wear on the inner diameter of the spring 86. Additionally, since the spring 86 is allowed to float within central opening 94 without restriction, localized stresses in the spring caused by engagement with the shaft in the prior art design are eliminated.

To prevent gear tooth rattle, the rate of first spring 86 should be such that the natural frequency of the spring-mass system is less than one-quarter of the distributing frequency to provide acceptable isolation. By way of example only for the size supercharger disclosed herein, spring 86 has a rate of about one-third inch pound per degree of movement of end 100 relative to end 102. The free length of a spring of such low rate would not have enough initial torque transmitting capacity to be operative in a reasonable relative rotation range such as provided by cushioning members 94. Accordingly, spring 86 is preloaded eight degrees to provide the spring with sufficient initial torque transmitting capacity.

Second spring 87 is generally C-shaped having a first end received in a blind bore 116 in body 80 (FIG. 11) and a second end that extends into a recess 118 (FIG. 5) in an end face of body 80, and is engageable with one of pins 74. Second spring 87 dampens impact of the engaged pin 74 caused by torque reversals (negative torque) during operation.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A torsion damping mechanism for a rotary blower that is adapted to be rotatably interposed between a first drive member for driving a first gear in constant mesh with a second gear and a second drive member rotatably driven in one direction by torque from a periodic combustion engine; the torsion damping mechanism comprising:

a generally annular body having a central opening and disposed for rotation about an axis and fixed to one of the drive members, the body including a plurality of circumferentially spaced apart bores and a plurality of circumferentially spaced apart generally arcuate-shaped slots;

a cushion damper including a plurality of cushioning members each adapted to be received in a corresponding slot in the body, the cushion damper having a webbing that extends over a portion of the central opening;

axially extending first pins each having one end loosely received by one of the slots and another end fixed to the first drive member;

axially extending second pins each having one end fixedly received by the bores and another other end fixed to the second drive member; and a spring fixed at one end to the body end having a free end extending radially in cantilever fashion into at least one of the slots, the spring interposed between the cushioning member of the one slot and the pin therein.

2. The torsion damping mechanism of claim 1, wherein at least one of the slots including an interference member positioned to create an interference fit between body and the cushioning members to secure the cushioning members in slots and inhibit movement of the cushion damper relative to the body.

3. A torsion damping mechanism for a rotary blower that is adapted to be rotatably interposed between a first drive member for driving a first gear in constant mesh with a second gear and a second drive member rotatably driven in one direction by torque from a periodic combustion engine; the torsion damping mechanism comprising:

a generally annular body having a central opening and disposed for rotation about an axis and fixed to one of the drive members, the body including a plurality of circumferentially spaced apart bores, a plurality of circumferentially spaced apart generally arcuate-shaped slots, and a central opening;

a cushion damper including a plurality of cushioning members each adapted to be received in a corresponding slot in the body, the cushion damper having a webbing that extends over a portion of the central opening;

axially extending first pins each having one end loosely received by one of the slots and another end fixed to the first drive member;

axially extending second pins each having one end fixedly received by the bores and another other end fixed to the second drive member; and a spring received in the ventral opening fixed at one end to the body and having a free end extending radially in cantilever fashion into at least one of the slots, the spring interposed between the cushioning member of the one slot and the pin therein; wherein the body is provided with at least one stress-reducing feature to reduce stress in the spring.

4. The torsion damping mechanism of claim 3, wherein end of the spring is fixed in a bore in the body, the stress-reducing feature including a pair of side walls of the bore that taper inwardly from a radially outward end wall to radii, which connect tapered side walls to central opening.

5. The torsion damping mechanism of claim 3, wherein the stress-reducing feature includes a tab that extends radially inwardly into central opening adjacent the spring, the tab engages the spring to inhibit twisting of the spring during operation of the rotary blower, without having the spring contact the shafts.

6. A rotary blower comprising:

a torsion damping mechanism that is adapted to be rotatably interposed between a first drive member for driving a first gear in constant mesh with a second gear and a second drive member rotatably driven in one direction by torque from a periodic combustion engine;

a generally annular body disposed for rotation about an axis and fixed to one of the drive members, the body including a plurality of circumferentially spaced apart bores and a plurality of circumferentially spaced apart generally arcuate-shaped slots;

a cushion damper including a plurality of cushioning members each adapted to be received in a corresponding slot in the body, the cushion damper including a webbing interconnecting the cushioning members in a manner that permits slots to remain unobstructed;

axially extending first pins each having one end loosely received by one of the slots and another end fixed to the first drive member, each of the first pins being substantially similar in length so as to permit torsion damping member to be disposed relative to first drive member in more than one angular position;

axially extending second pins each having one end fixedly received by the bores and another other end fixed to the second drive member; and a spring fixed at one end to the body and having a free end extending radially in cantilever fashion into at least one of the slots, the spring interposed between the cushioning member of the one slot and the pin therein.

7. The rotary blower of claim 6, wherein all of the slots include an interference member positioned to create an interference fit between the body and the cushioning members to secure the cushioning members in slots and inhibit movement of the cushion damper relative to the body.

* * * * *